(12) United States Patent
Koren

(10) Patent No.: US 11,980,803 B2
(45) Date of Patent: May 14, 2024

(54) TRAINING DEVICE FOR EXERCISE AND SPORTS

(71) Applicant: Pro Fit Technologies, LLC, Orlando, FL (US)

(72) Inventor: Paul Koren, Orlando, FL (US)

(73) Assignee: Pro Fit Technologies, LLC, Orlando, FL (US)

(*) Notice: Subject to any disclaimer, the term of this patent is extended or adjusted under 35 U.S.C. 154(b) by 298 days.

(21) Appl. No.: 17/378,159

(22) Filed: Jul. 16, 2021

(65) Prior Publication Data

US 2023/0013469 A1 Jan. 19, 2023

(51) Int. Cl.
*A63B 71/06* (2006.01)
*A63B 24/00* (2006.01)

(52) U.S. Cl.
CPC ...... *A63B 71/0622* (2013.01); *A63B 24/0062* (2013.01); *A63B 2071/063* (2013.01); *A63B 2071/0694* (2013.01); *A63B 2220/20* (2013.01); *A63B 2220/62* (2013.01);
(Continued)

(58) Field of Classification Search
CPC ............ A63B 71/0622; A63B 24/0062; A63B 2071/063; A63B 2071/0694; A63B 2220/20; A63B 2220/62; A63B 2220/805; A63B 2220/833; A63B 2225/74; A63B 2230/067; A63B 24/0003; A63B 24/0075; A63B 2024/0068; A63B 2024/0071; A63B 2071/0625; A63B 2209/08; A63B 2220/17; A63B 2220/30; A63B 2220/80; A63B 69/0055; A63B 2220/801; A63B 2220/806; A63B 2220/808; A63B 2225/50; A63B 2230/045; G09B 19/0038
See application file for complete search history.

(56) References Cited

U.S. PATENT DOCUMENTS 9,791,246 B2  10/2017  D'Andrade
9,808,671 B2  11/2017  D'Andrade et al.
10,279,216 B2  5/2019  D'Andrade et al.
(Continued)

FOREIGN PATENT DOCUMENTS

CA        2862214 C  *  8/2020  ........... A61B 5/0002

OTHER PUBLICATIONS

Fitlight, www.fitlighttraining.com, printed Dec. 10, 2021.
(Continued)

*Primary Examiner* — Jeffrey S Vanderveen
(74) *Attorney, Agent, or Firm* — AKERMAN LLP

(57) ABSTRACT

According to one example, a training device includes a first set of time of flight sensors (ToF) positioned to face in a first direction, a plurality of addressable red, green, blue light emitting diodes (RGB LEDs) positioned to face in the first direction, and a second set of ToF sensors positioned to face in a second direction that is perpendicular to the first direction. The training device includes and/or is in communication with one or more processors that can determine a training program for a user that includes visual signals that represent a plurality of actions for performance by the user. Also, for each of the plurality of actions, the training device can cause a first set of the plurality of addressable RGB LEDs to provide a visual indication of the corresponding action for performance by the user, and detect whether the user performed the corresponding action.

18 Claims, 4 Drawing Sheets

(52) U.S. Cl.
CPC ... *A63B 2220/805* (2013.01); *A63B 2220/833* (2013.01); *A63B 2225/74* (2020.08); *A63B 2230/067* (2013.01)

(56) References Cited

U.S. PATENT DOCUMENTS

| | | | |
|---|---|---|---|
| 11,277,495 B2 * | 3/2022 | Kim | H04L 12/66 |
| 2014/0369695 A1 | 12/2014 | D'Andrade et al. | |
| 2017/0059286 A1 | 3/2017 | D'Andrade | |
| 2018/0214744 A1 | 8/2018 | D'Andrade et al. | |
| 2019/0168098 A1 * | 6/2019 | Kinsella | F41J 5/04 |
| 2019/0366158 A1 | 12/2019 | D'Andrade et al. | |
| 2020/0108291 A1 | 4/2020 | Piazza et al. | |
| 2021/0154557 A1 * | 5/2021 | Loudermilk, Jr. | A63B 71/0619 |
| 2021/0220715 A1 | 7/2021 | Colding et al. | |
| 2023/0013469 A1 * | 1/2023 | Koren | A63B 24/0062 |

OTHER PUBLICATIONS

SIBOASI Reaction Lights Training Speed Agility Training Lights, www.amazon.com/SIBOASI-Reaction-Training-Portable-Basketball/dp/B08BXJ52JS/ref=asc_df_ B08BXJ52JS/?tag=hyprod-20&linkCode=df0&hvadid=459710755857&hvpos=&hvnetw=g&hvrand=15580133290267860167&hvpone=&hvptwo=&hvqmt=&hvdev=c&hvdvcmdl=&hvlocint=&hvlocphy-9011998&hvtargid=pla-944737252999&psc=1, printed Oct. 2, 2012.

* cited by examiner

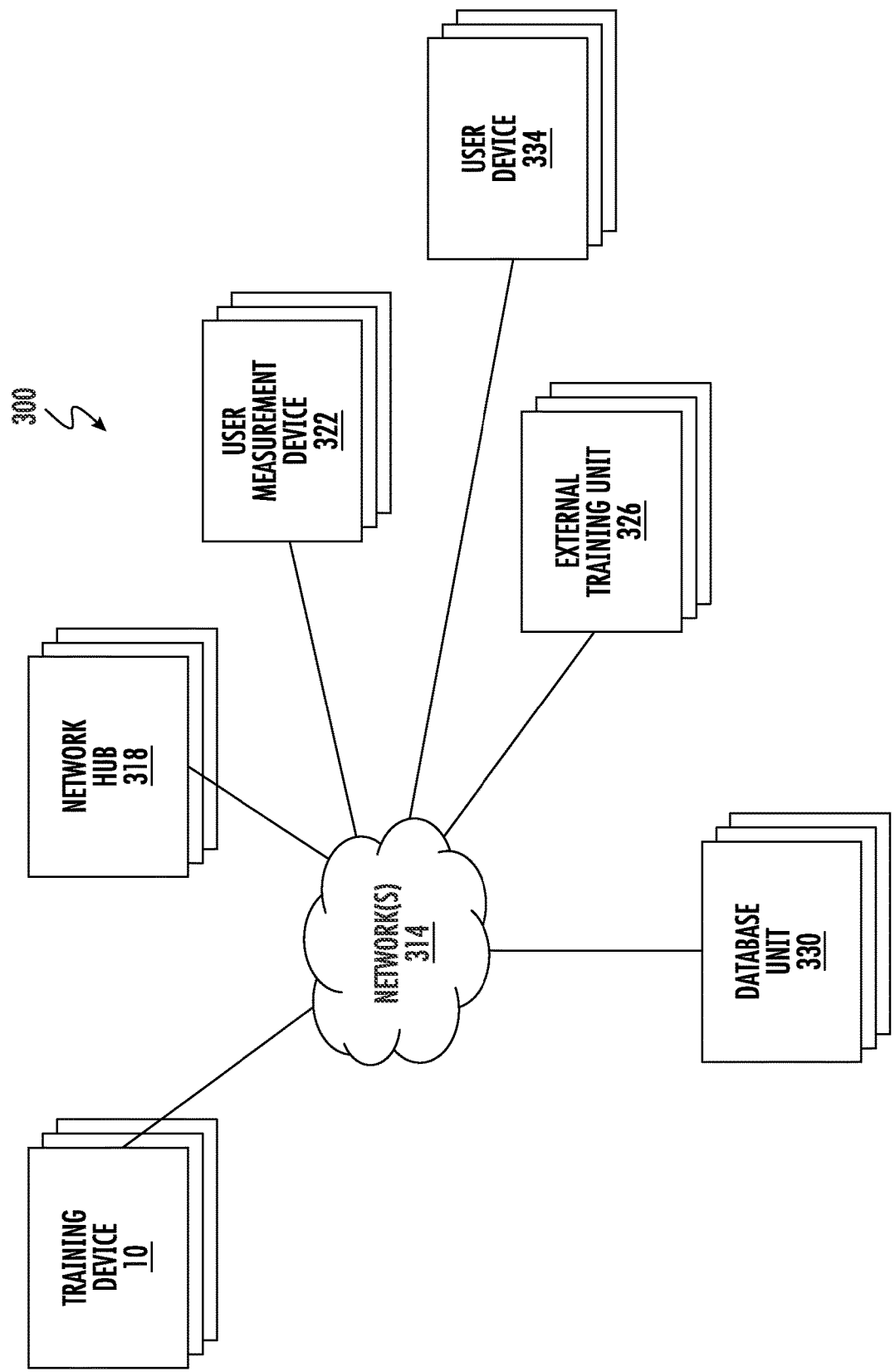

TRAINING DEVICE FOR EXERCISE AND SPORTS

TECHNICAL FIELD

This disclosure relates generally to the field of exercise and sports, and more specifically to a training device for exercise and sports.

BACKGROUND

Traditionally, a user has trained or worked out on their own, or using a trainer or coach. Such traditional workout or training techniques, however, may be deficient.

SUMMARY

In a first example, a portable training device includes one or more substrates, a base, and a lens cover attached to the base and positioned over the one or more substrates. The substrates have a first set of one or more time of flight sensors (ToF) positioned to face in a first direction, a plurality of addressable red, green, blue light emitting diodes (RGB LEDs) positioned to face in the first direction, and a second set of one or more ToF sensors positioned to face in a second direction that is perpendicular to the first direction. The portable training device includes and/or is in communication with one or more processors. The processors are configured to determine a training program for a user that includes visual signals that represent a plurality of actions for performance by the user. For each of the plurality of actions, the processors are further configured to cause a first set of the plurality of addressable RGB LEDs to provide a visual indication of the corresponding action for performance by the user. Following the visual indication of the corresponding action for performance by the user, the processors are further configured to utilize a first set of one or more indications received from the first set of one or more ToF sensors and/or the second set of one or more ToF sensors to detect whether the user performed the corresponding action. The processors are further configured to transmit an indication of one or more of the detections for display.

In a second example, a portable training device includes a first substrate, a second substrate positioned underneath the first substrate, a base positioned underneath the second substrate, and a lens cover attached to the base and positioned over the first substrate and the second substrate. The first substrate has a first set of one or more time of flight (ToF) sensors positioned on the first substrate to face in a vertical direction, and further has a plurality of addressable red, green, blue light emitting diodes (RGB LEDs) positioned on the first substrate to face in the vertical direction. The second substrate has one or more processors positioned on the second substrate, and a second set of one or more ToF sensors positioned on a periphery of the second substrate to face in a horizontal direction that is perpendicular to the vertical direction. The processors are configured to determine a training program for a user that includes visual signals that represent a plurality of actions for performance by the user, and determine a distraction program for the user that includes visual signals that represent a plurality of false actions for performance by the user. For each of the plurality of actions, the processors are configured to cause a first set of the plurality of addressable RGB LEDs to provide a visual indication of the corresponding action for performance by the user. Following the visual indication of the corresponding action for performance by the user, the processors are further configured to utilize a first set of one or more indications received from the first set of one or more ToF sensors and/or the second set of one or more ToF sensors to detect whether the user performed the corresponding action. The processors are further configured to determine whether a heart rate of the user has reached a predetermined rate of at least 75% of the max heart rate for the user. Following a determination that the heart rate of the user has reached the predetermined rate of at least 75% of the max heart rate for the user, the processors are further configured, for each of the plurality of false actions, to cause a second set of the plurality of addressable RGB LEDs to provide a visual indication of the corresponding false action for performance by the user, following the visual indication corresponding to one of the actions of the plurality of actions. Following the visual indication of the corresponding false action for performance by the user, the processors are further configured to utilize a second set of one or more indications received from the first set of one or more ToF sensors and/or the second set of one or more ToF sensors to detect whether the user performed the corresponding false action. The processors are also configured to transmit an indication of one or more of the detections for display.

BRIEF DESCRIPTION OF THE FIGURES

For a more complete understanding of the present disclosure and its features and advantages, reference is now made to the following description, taken in conjunction with the accompanying drawings, in which:

FIG. 3 is an example training system that includes one or more training devices.

DETAILED DESCRIPTION

Examples in the present disclosure are best understood by referring to FIGS. 1A-3 of the drawings, like numerals being used for like and corresponding parts of the various drawings.

Figure 1A:
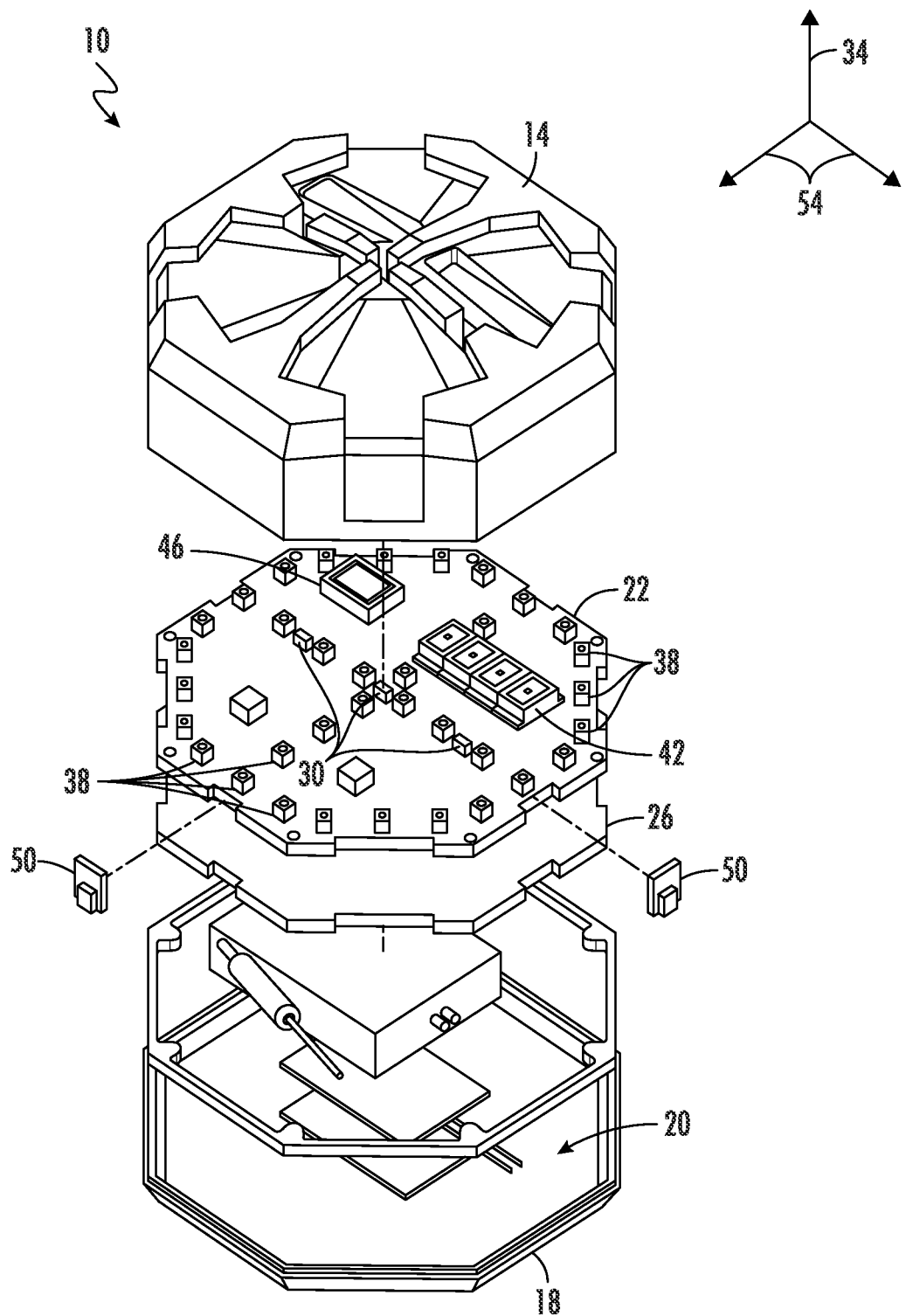
FIG. 1A is an exploded view of one example of a training device.
Figure 1B:
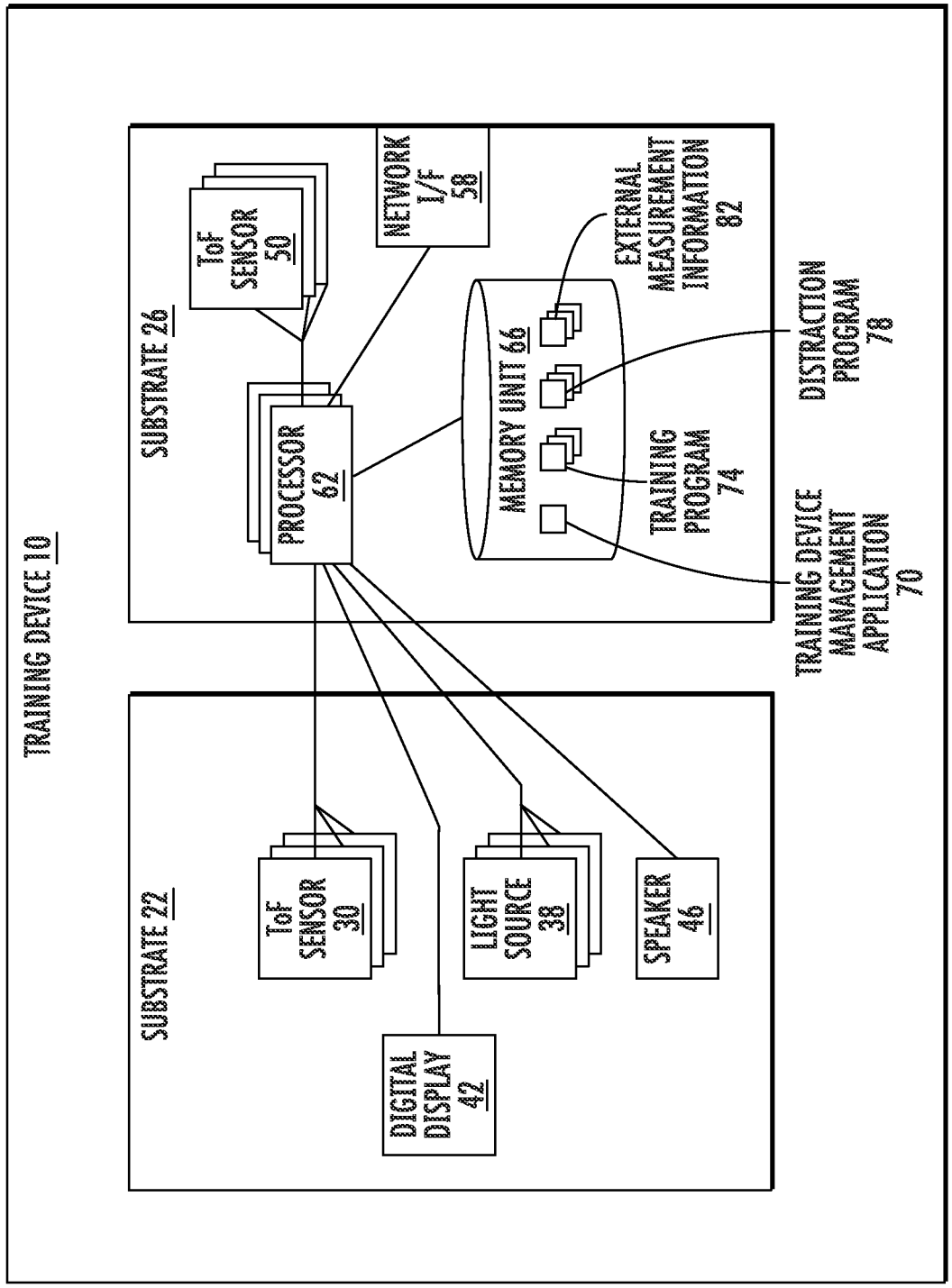
FIG. 1B is a schematic representation of components of the training device of FIG. 1A.

FIGS. 1A-1B illustrate an example training device 10 that may assist a user in exercising and/or training (e.g., training for sports). In the illustrated example, the training device 10 instructs a user (e.g., using one or more lights and/or audible instructions) to perform one or more actions (e.g., run to the right, throw a punch, perform a pushup). Then the training device 10 detects (e.g., using one or more time of flight sensors) whether the user performed the actions. Following one of these instructions (e.g., in-between successive instructions), the training device 10 instructs the user (e.g., using one or more lights and/or audible instructions) to perform one or more false actions (e.g. run to the left, jump in the air, perform a burpee), which are designed to be ignored by the user. Then the training device 10 detects (e.g., using one or more time of flight sensors) whether the user performed the false actions. The training device 10 also transmits indications of one or more of these detections for display.

The training device 10 may be used for various skill testing/training, in some examples. As an example of this, a user may be signaled to perform some action(s) in response to lights and/or sounds produced by the training device 10, and the training device 10 may detect whether the user performed the action(s). The training device 10 may assist a user in training to perform under physical (not mental) fatigue ("PUPF"), in some examples. As an example of this, the training device 10 may utilize a distraction program to try and distract the user. This distraction may help the user learn to ignore their own brain commands to stop or slow down, which can further assist in training and sports.

In the illustrated example, the training device 10 includes a lens cover 14 coupled to a base 18. When coupled together, the lens cover 14 and the base 18 define an inside compartment 20 that includes one or more of the components of the training device 10. The lens cover 14 is sized to be positioned over the components of the training device 10. This may provide protection to the components from one or more elements (e.g., wind, water) and/or debris. The lens cover 14 includes one or more translucent (or semi-translucent) lenses, in some examples. These lenses may allow light from light sources 38 to shine through the lens cover 14, so as to be seen by a user. The lens cover 14 may have any size and/or shape, and may further be made of an any suitable material(s) (e.g., plastic, metal).

The base 18 provides the bottom-most portion of the training device 10, when the training device 10 is positioned horizontal (i.e., upright) (as is seen in the FIG. 1A). The base 18 may structurally support the weight of the training device 10, and all its components. The base 18 may have any size and/or shape, and may further be made of any suitable material(s) (e.g., plastic, metal).

In the illustrated example, the training device 10 further includes a first substrate 22 and a second substrate 26, each of which may hold components of the training device 10. The substrates 22 and 26 each refer to a structural support layer that holds one or more components. In some examples, the substrates 22 and 26 are each a printed circuit board. In other examples, the substrates 22 and 26 each hold one or more printed circuit boards (where the printed circuit boards include one or more components). The substrates 22 and 26 may each have any size and/or shape, and may further be made of any suitable material(s) (e.g., plastic, metal). The substrates 22 and 26 may be positioned in any location within the inside compartment 22. In the illustrated example, the second substrate 26 is positioned vertically underneath the first substrate 22, and the base 18 is positioned vertically underneath the second substrate 26. This vertical positioning refers to the positioning of the components in relation to each other when the training device 10 is positioned horizontal (i.e., upright) (as is seen in FIG. 1A). The substrates 22 and 26 may also be positioned any vertical distance from each other within the inside compartment 22. Furthermore, although two substrates 22 and 26 are illustrated in FIGS. 1A-1B, the training device 10 may include only a single substrate, or more than two substrates.

In the illustrated example, one or more time of flight (ToF) sensors 30 are positioned on the first substrate 22. A time of flight sensor 30 is any sensor (and/or camera) that can sense the proximity of an object (e.g., a user training with the training device 10) and/or measure the distance of the object from the sensor, based on a time difference between the emission of a signal (e.g., one or more photons) and its return to the sensor 30 after being reflected by the object (e.g., in accordance with ToF principles). One example of a time of flight sensor 30 is the VL53L1 manufactured by STMicroelectronics. Although the sensor(s) 30 have been described above as being a time of flight sensors, in other examples, the sensor(s) 30 may be any other type of proximity sensor, such as an infra-red proximity sensor.

As is discussed above, the time of flight sensor(s) 30 can sense the proximity of an object (e.g., a user training with the training device 10) and/or measure the distance of the object from the sensor 30. This may allow the time of flight sensor(s) 30 to sense one or more actions performed by the user. For example, the time of flight sensor(s) 30 may sense that the user performed a particular gesture, ran to the right of the training device 10, threw a punch, performed a pushup, any other action, any non-action (e.g., the user stood still), or any combination of the preceding. As an example of this, the time of flight sensor(s) 30 may sense the user positioned above the time of flight sensor(s) 30, and may further sense the user moving vertically downwards towards and then vertically away from the time of flight sensor(s) 30 (consistent with a pushup). The action may be sensed by any number of the time of flight sensors 30, such as one time of flight sensor 30 or all of them.

The time of flight sensor(s) 30 may also send one or more indications of the sensed action to the processor(s) 62. For example, if the time of flight sensor(s) 30 senses that the user is performing a pushup, the time of flight sensor(s) 30 may transmit an indication of that pushup to the processor(s) 62. The indication of the sensed action may be any information that allows the processor to identify the sensed action, so as to determine whether the user has performed the action. As an example, when the time of flight sensor(s) 30 senses the user performing a pushup, the time of flight sensor(s) 30 may transmit data to the processor(s) 62 that identifies the user's position (e.g., distance from the sensor 30) at a particular time throughout (or at different time segments) during the pushup. This data may allow the processor(s) 62 to detect that the user is performing a pushup. It may also allow the processor(s) 62 to determine any information regarding the pushup, such as time for each complete pushup, the speed of descent, the speed of ascent, distance at bottom of pushup, distance at top of pushup, number of pushups, any other information, or any combination of the preceding.

The time of flight sensor(s) 30 may be positioned directly on the first substrate 22 (e.g., when the substrate 22 is a printed circuit board), or the time of flight sensor(s) 30 may be positioned indirectly on the first substrate 22 (e.g., when the substrate 22 holds a printed circuit board, and the time of flight sensor(s) 30 are positioned directly on the printed circuit board). When positioned on the first substrate 22 (e.g., directly or indirectly), the time of flight sensor(s) 30 may face in any direction, such as first direction 34. In the illustrated example, this first direction 34 causes the time of flight sensor(s) 30 to face upward, when the training device 10 is positioned horizontal (i.e., upright) (as is seen in the FIG. 1A). Alternatively, if the training device 10 is positioned vertically (i.e., sideways, such as when it is attached to a vertical wall), this first direction 34 causes the time of flight sensor(s) 30 to face horizontally. By facing in the first direction 34, the time of flight sensor(s) 30 may sense actions performed in the line of sight of the first direction 34.

The training device 10 may include any number of time of flight sensor(s) 30 positioned on the first substrate 22. For example, the training device 10 may include one time of flight sensor 30, two time of flight sensors 30, three time of flight sensors 30, four time of flight sensors 30, any other number of time of flight sensors 30, or any range of time of flight sensors 30, such as at least two time of flight sensors 30, at least three time of flight sensors 30, or a range of 2-5 time of flight sensors 30. In the illustrated example, the training device 10 includes three time of flight sensor(s) 30 positioned on the first substrate 22, in a row in the middle of the first substrate 22.

In the illustrated example, one or more light sources 38 are positioned on the first substrate 22. A light source 38 is any device or structure that emits light. An example of a light source 38 is a light emitting diode (LED). The light source 38 may emit any color light, such as red, blue, green, any other color, or any combination of the preceding. In the illustrated example, the light source 38 is an addressable red, green, blue light emitting diode (RGB LED). This RGB LED is a cluster of a red LED, a green LED, and a blue LED, where the cluster can operate together to blend the red, green, and blue lights so as to create almost any color. Furthermore, each RGB LED may be addressable, so that each RGB LED can be operated independently of any other RGB LED. This may allow one RGB LED to emit a first colored light (e.g., purple), while a second RGB LED emits a second colored light that may be different from the first colored light (e.g., green) or the same as the first colored light (e.g., purple).

The light source(s) 38 may be positioned directly on the first substrate 22 (e.g., when the substrate 22 is a printed circuit board), or the light source(s) 38 may be positioned indirectly on the first substrate 22 (e.g., when the substrate 22 holds a printed circuit board, and the light source(s) 38 are positioned directly on the printed circuit board). When positioned on the first substrate 22 (e.g., directly or indirectly), the light source(s) 38 may face in any direction, such as the first direction 34. In the illustrated example, this first direction 34 causes the light source(s) 38 to face upward, when the training device 10 is positioned horizontal (i.e., upright) (as is seen in the FIG. 1A). Alternatively, if the training device 10 is positioned vertically (i.e., sideways, such as when it is attached to a vertical wall), this first direction 34 causes the light source(s) 38 to face horizontally. By facing in the first direction 34, the light source(s) 38 may emit light out of the lens cover 14 so as to be viewed by the user.

The training device 10 may include any number of light source(s) 38 positioned on the first substrate 22. For example, the training device 10 may include one light source 38, five light sources 38, ten light sources 38, twenty light sources 38, forty light sources 38, 100 light sources 38, any other number of light sources 38, or any range of light sources 38, such as at least twenty light sources 38, at least thirty light sources 38, a range of 20-50 light sources 38, or a range of 30-40 light sources 38. In the illustrated example, the training device 10 includes 37 light sources 38 positioned on the first substrate 22. These light sources 38 are positioned to extend around the circumference (or periphery) of the first substrate 22, and further positioned to form an "X" in the center of the first substrate 22.

The number and positioning of light sources 38 on the first substrate 22 may allow the training device 10 to generate shapes. For example, the training device 10 may generate a colored "X" by having only the inside light sources 38 emit light. As another example, the training device 10 may generate a colored circle by having only the periphery light sources 38 emit light. As a further example, the training device 10 may generate a colored left arrow by having only the left side periphery and left side inside light sources 38 emit light. The training device 10 may utilize the light sources 38 to generate any other shape, in any color.

The light source(s) 38 may be used to instruct a user to perform one or more actions. For example, the light source(s) 38 may emit light in order to instruct a user to perform one or more actions. As an example of this, one or more of the light source(s) 38 may emit a colored shape (e.g., green circle) to instruct a user to perform an action (e.g., a pushup). The training device 10 may then detect whether the user performed the action (as is discussed above). As another example, the light source(s) 38 may emit light in order to instruct a user to perform one or more false actions. As an example of this, one or more of the light source(s) 38 may emit a colored shape (e.g., a yellow circle) to instruct a user to perform a false action (e.g., a pushup). The training device 10 may then detect whether the user performed the false action (as is discussed above).

The light source(s) 38 may also be used to provide any other information to the user. For example, the light source(s) 38 may emit a colored shape (e.g., a red "X") to inform a user that they failed to perform an action (e.g., failed to perform the instructed pushup) or that they incorrectly performed a false action (e.g., they performed the pushup, when they should have ignored the instruction).

In the illustrated example, a digital display 42 is positioned on the first substrate 22. The digital display 42 is any device or structure that can display one or more numbers, letters, symbols, or any combination of the preceding. In the illustrated example, the digital display 42 is a numeric LED display that can display numbers (e.g., digits). For example, the digital display 42 may display a total of 4 different digits. This may allow the digital display 42 to display time (e.g., the current time, time left in a training program, current stop watch count), repetition count (e.g., the current number of pushups performed), error count (e.g., the number of false actions improperly performed), or any other number. The digital display 42 may display one or more numbers, letters, and/or symbols by emitting light to form the numbers, letters, and/or symbols.

The digital display 42 may be positioned directly on the first substrate 22 (e.g., when the substrate 22 is a printed circuit board), or the digital display 42 may be positioned indirectly on the first substrate 22 (e.g., when the substrate 22 holds a printed circuit board, and the digital display 42 is positioned directly on the printed circuit board). When positioned on the first substrate 22 (e.g., directly or indirectly), the digital display 42 may face in any direction, such as the first direction 34. In the illustrated example, this first direction 34 causes the digital display 42 to face upward, when the training device 10 is positioned horizontal (i.e., upright) (as is seen in the FIG. 1A). Alternatively, if the training device 10 is positioned vertically (i.e., sideways, such as when it is attached to a vertical wall), this first direction 34 causes the digital display 42 to face horizontally. By facing in the first direction 34, the digital display 42 (and its display of numbers) may be viewed by the user through the lens cover 14.

In the illustrated example, one or more speaker(s) 46 are positioned on the first substrate 22. The speaker 46 is any device or structure that generates sound by converting an electrical audio signal into the corresponding sound. The speaker 46 may be positioned directly on the first substrate 22 (e.g., when the substrate 22 is a printed circuit board), or the speaker 46 may be positioned indirectly on the first substrate 22 (e.g., when the substrate 22 holds a printed circuit board, and the speaker 46 is positioned directly on the printed circuit board). In some examples, the speaker 46 may be electrically coupled to an audio amplifier and/or an audio digital-to-analog converter (DAC) positioned (e.g., directly or indirectly) on the first substrate 22 and/or the second substrate 26.

The speaker 46 may be used to instruct a user to perform one or more actions. For example, the speaker 46 may generate sound in order to instruct a user to perform one or more actions. As an example of this, the speaker 46 may generate a buzzing noise to instruct a user to start performing an action (e.g., begin exercising). As another example of this, the speaker 46 may generate a voice instruction (e.g., "begin", "go", "start") to instruct a user to start performing an action (e.g., begin exercising) and may further generate another voice instruction (e.g., "stop", "end") to instruct a user to stop performing an action (e.g., stop exercising). As a further example, the speaker may generate a voice instruction that tells the user what action to perform. As an example of this, the speaker may generate the voice instruction "pushups" to tell the user to perform one or more pushups. The speaker 46 may also be used to provide any other information to the user.

The speaker 46 may be used in combination with the light source(s) 38 to instruct a user to perform one or more actions, in some examples. For example, the speaker 46 may generate a sound that tells the user what action to perform (e.g., "pushups"), and the light source(s) 38 may emit light in order to instruct a user when to perform the action (e.g., perform a pushup each time the light source(s) 38 emit a green circle). Additionally, the speaker 46 and light source(s) 38 may be used in any other combination to instruct a user to perform any other one or more actions.

As is discussed above, the training device 10 may further include the second substrate 26. In the illustrated example, one or more time of flight (ToF) sensors 50 are positioned on the second substrate 26. A time of flight sensor 50 is any sensor (and/or camera) that can sense the proximity of an object (e.g., a user training with the training device 10) and/or measure the distance of the object from the sensor, based on a time difference between the emission of a signal (e.g., one or more photons) and its return to the sensor 30 after being reflected by the object (e.g., in accordance with ToF principles). One example of a time of flight sensor 50 is the VL53L1 manufactured by STMicroelectronics. In some examples, the time of flight sensor(s) 50 may be the same type of sensor as the time of flight sensor(s) 30. Although the sensor(s) 50 have been described above as being time of flight sensors, in other examples, the sensor(s) 50 may be any other type of proximity sensors, such as an infra-red proximity sensors.

As is discussed above, the time of flight sensor(s) 50 can sense the proximity of an object (e.g., a user training with the training device 10) and/or measure the distance of the object from the sensor 50. This may allow the time of flight sensor(s) 50 to sense one or more actions performed by the user. For example, the time of flight sensor(s) 50 may sense that the user performed a particular gesture, ran to the right of the training device 10, threw a punch, performed a pushup, any other action, any non-action (e.g., the user stood still), or any combination of the preceding. As an example of this, the time of flight sensor(s) 50 may sense the user positioned horizontally across from the time of flight sensor(s) 50, and may further sense the user moving horizontally towards and then horizontally away from the time of flight sensor(s) 50 (consistent with the user running towards the training device 10, then running past the training device 10). The action may be sensed by any number of the time of flight sensors 50, such as one time of flight sensor 50 or all of them.

The time of flight sensor(s) 50 may also send one or more indications of the sensed action to the processor(s) 62. For example, if the time of flight sensor(s) 50 sense that the user is running towards the training device 10, the time of flight sensor(s) 50 may transmit an indication of that action to the processor(s) 62. The indication of the sensed action may be any information that allows the processor to identify the sensed action, so as to determine whether the user has performed the action. As an example, when the time of flight sensor(s) 50 sense the user running towards the training device 10 (discussed above), the time of flight sensor(s) 50 may transmit data to the processor(s) 62 that identifies the user's position (e.g., distance from the sensor 50) at a particular time throughout (or at different time segments) during the run towards the training device 10. This data may allow the processor(s) 62 to detect that the user is running towards the training device 10. It may also allow the processor(s) 62 to determine any information regarding the run, such as speed of the run, any acceleration/deacceleration in the run, the time when the user reaches the training device 10, any turns or changes of direction in the run, any other information, or any combination of the preceding.

The time of flight sensor(s) 50 may be positioned directly on the second substrate 26 (e.g., when the second substrate 26 is a printed circuit board), or the time of flight sensor(s) 50 may be positioned indirectly on the second substrate 26 (e.g., when the second substrate 26 holds a printed circuit board, and the time of flight sensor(s) 50 are positioned directly on the printed circuit board or are attached to the printed circuit board). When positioned on the second substrate 26 (e.g., directly or indirectly), the time of flight sensor(s) 50 may face in any direction, such as second directions 54. The second directions 54 may each be positioned in a horizontal plane that is perpendicular (i.e., 90 degrees) to the first direction 34, as is illustrated. In other examples, the second directions 54 may be positioned in approximately horizontal planes that are approximately perpendicular (i.e., 90 degrees+/−5 degrees) to the first direction 34. In the illustrated example, the second directions 54 cause the time of flight sensor(s) 50 to face horizontally, when the training device 10 is positioned horizontally (i.e., upright) (as is seen in the FIG. 1A). Alternatively, if the training device 10 is positioned vertically (i.e., sideways, such as when it is attached to a vertical wall), these second directions 54 cause the time of flight sensor(s) 50 to face vertically. By facing in the second direction(s) 54, the time of flight sensor(s) 54 may sense actions performed in the line of sight of the second direction(s) 54.

The time of flight sensor(s) 50 may be positioned in any location on the second substrate 26 (e.g., directly or indirectly). In the illustrated example, the time of flight sensor(s) 50 are positioned on the periphery of the second substrate 26 (e.g., directly or indirectly), and are further positioned perpendicular to the second substrate 26.

The training device 10 may include any number of time of flight sensor(s) 50 positioned on the second substrate 26. For example, the training device 10 may include one time of flight sensor 50, two time of flight sensors 50, three time of flight sensors 50, four time of flight sensors 50, any other number of time of flight sensors 50, or any range of time of flight sensors 50, such as at least two time of flight sensors 50, at least three time of flight sensors 50, or a range of 2-5 time of flight sensors 50. In the illustrated example, the training device 10 includes four time of flight sensor(s) 50 positioned on the periphery of the second substrate 26 (e.g., directly or indirectly), and further positioned perpendicular to the second substrate 26. The time of flight sensors 50 are positioned an equal number of degrees from each other along the periphery, in some examples. For example, in the illustrated example, the time of flight sensors 50 are each positioned 90 degrees or approximately (i.e., +/−5 degrees) 90 degrees from each other along the periphery of the second substrate 26. This allows the time of flight sensors 50 to face in four separate second directions 54 (e.g., north, south, east, west), so as to sense a user on all sides of the training device 10 (e.g., the north side, south side, east side, west side, when the training device 10 is positioned horizontally).

In the illustrated example, one or more network interfaces 58, one or more processors 62, and one or more memory units 66 are positioned (e.g., directly or indirectly) on the second substrate 26. The network interface(s) 58, processor(s) 62, and memory units 66 are illustrated in FIG. 1B.

A network interface 58 represents any suitable device operable to receive information from a communication network (e.g., a BLUETOOTH network), transmit information through the communication network, perform processing of information, communicate with other devices (or components), or any combination of the preceding. For example, a network interface 58 may receive a current heart rate of the user from a heart rate monitor worn by the user. A network interface 58 represents any port or connection, real or virtual, including any suitable hardware and/or software, including protocol conversion and data processing capabilities, to communicate through a local area network (LAN), a metropolitan area network (MAN), a wide area network (WAN), or other communication system that allows training device 10 to exchange information with a communication network and/or one or more devices or components (over a communication network). The network interface(s) 58 is (or includes) a BLUETOOTH integrated circuit (such as a BLUETOOTH low energy integrated circuit with an Advanced RISC Machines (ARM) processor, or an upgradable BLUETOOTH low energy network processor by STMicroelectronics, such as the BlueNRG-MS) and an antenna, in some examples. In other examples, the network interface(s) 58 is (or includes) an nRF24L01 transceiver module and an antenna. The antenna of the network interface(s) 58 may (or may not) be positioned on the second substrate 26.

A processor 62 communicatively couples to the network interface(s) 58 and memory unit(s) 66, and controls the operation and administration of training device 10 by processing information received from the network interface(s) 58 and/or memory unit(s) 66. A processor 62 includes any hardware and/or software that operates to control and process information. For example, processor(s) 62 execute a training device management application 70 to control the operation of the training device 10. A processor 62 may be a programmable logic device, a microcontroller, a microprocessor, any suitable processing device, or any combination of the preceding. In the illustrated example, the processor(s) 62 is (or includes) an ARM Cortex M4 Core 32 bit ARM Microcontroller. The processor(s) 62 may communicate with additional processors distributed in different locations within the training device 10, in some examples. For example, the processor(s) 62 may communicate (and control) a display processor (e.g., ARM Cortex 0) positioned (e.g., directly or indirectly) on the first substrate 22. In accordance with instructions received from the processor(s) 62, this display processor may control the operations of the light source(s) 38 and the digital display 42, in some examples.

A memory unit 66 stores, either permanently or temporarily, data, operational software, or other information for processor(s) 62. A memory unit 66 includes any one or a combination of volatile or non-volatile local or remote devices suitable for storing information. For example, a memory unit 66 may include random access memory (RAM), read only memory (ROM), magnetic storage devices, optical storage devices, any other suitable information storage device, or any combination of the preceding. While illustrated as including particular information modules, memory unit 66 may include any suitable information for use in the operation of training device 10.

In the illustrated example, memory unit 66 includes training device management application 70, training program 74, distraction program 78, and external measurement information 82. Training device management application 70 represents any suitable set of instructions, logic, or code embodied in a computer-readable storage medium and operable to facilitate the operation of the training device 10.

Training program 74 represents a program that may be utilized by the training device 10 to assist the user in exercising and/or training (e.g., training for sports). The training program 74 may include a list of one or more actions to be performed by the user (e.g., pushups, sit ups), an order of performance of the action(s), a time frame for each action (e.g., start time, end time, repetition number), performance baselines for each action (e.g., minimum amount of performed actions in a set time, minimum speed (or other measurement) of performance), any other information that may be used to assist the user in exercising and/or training, or any combination of the preceding. The training program 74 may include a list of visual signals (e.g., green light) and/or audio signals (e.g., buzzing noise) that represent the action(s) and/or other information. The training device 10 may present these signals to the user (e.g., via light source(s) 38 and/or speaker(s) 42) as visual and/or audio indications, so as to instruct a user to perform one or more actions. As one example of this, the training program 74 may indicate that the user is supposed to perform 20 pushups within a 1 minute time period, where each pushup is performed at a particular time (or a random time) within that time period. In such an example, the training program 10 may present a visual indication (e.g., green circle) and/or an audio signal (e.g., "go") to the user in accordance with the training program 74, so as to instruct the user to perform the pushup.

A training program 74 may be dynamic (i.e., it may change based on data received during execution of the program) or it may be static (i.e., linear/chronological). As an example, a training program 74 may link to heart rate data. Once a particular heart rate is reached (e.g., 70% or more), the training program 74 may trigger another program (e.g., a distraction program 78) to instruct the user to perform particular activities while under fatigue (such as exercises requiring mental decisions, coordination, agility). The training program 74 may monitor heart rate while the user is performing activities under fatigue and then increase or decrease physical exertion through the exercises to increase heart rate, increase heart rate, or maintain heart rate in a desired range.

Distraction program 78 represents a program that may be utilized by the training device 10 to attempt to distract the user while exercising and/or training (e.g., training for sports). The distraction program 78 may include a list of one or more false actions to be performed by the user (e.g., pushups, sit ups). A false action refers to an action (e.g., physical action) that the user is supposed to not perform. That is, the false action is a distraction that the user is supposed to ignore. The false action may also refer to a mental action (e.g., count to ten, perform a math problem in your head). That is, the false action is a distraction that the user is supposed to perform in their head, so as to distract them from the exercises they are performing. The distraction program 78 may include a list of visual signals (e.g., green light) and/or audio signals (e.g., buzzing noise) that represent the false action(s). The training device 10 may present these signals to the user (e.g., via light source(s) 38 and/or speaker 42) as visual indications and/or audio indications, so as to instruct a user to perform one or more false actions. As one example of this, the training program 74 (discussed above) may indicate that the user is supposed to perform 20 pushups within a 1 minute time period, where each pushup is performed at a particular time (or a random time) within that time period. In such an example, the training program 10 may present a visual indication (e.g., green circle) and/or an audio signal to the user in accordance with the training program 74, so as to instruct the user to perform the pushup. The user is supposed to ignore these indications, and only focus on the indications that are presented in accordance with the training program 74 (discussed above). For example, the user may be training by performing a pushup each time the training device 10 displays a green circle using light source(s) 38, and the distraction program 78 may cause the training device 10 to display a red circle using the light source(s) 38 in-between two successive green circles. In such an example, the display of the red circle is an instruction to the user to perform a false action (e.g., another pushup), and the user is supposed to ignore the instruction and not perform the action (e.g., another pushup). In another example, the distraction program 78 may cause the training device 10 to flash a yellow light four times (causing the user to count to four), or may cause the training device 10 to provide a math problem (e.g., the speaker emits "what is 3 plus 3"). In such an example, the false action may distract the user from their workout by requiring them to use mental energy to solve the problem (and may require the user to yell out the answer, which can be heard by a microphone optionally included in the training device 10).

External measurement information 82 may be any measurement information that is transmitted to the training device 10 from an external device or component. For example, external measurement information 82 may include a user's current heat rate, which was transmitted to the training device 10 (over the communication network) by a heart rate monitor worn by the user. As another example, external measurement information 82 may include sensor information transmitted to the training device 10 (over the communication network) from a second training device 10. In such an example, the second training device 10 may detect an action performed by the user, and the second training device 10 may transmit this detection to the training device 10 (over the communication network). As such, the training device 10 can receive and utilize information that it does not initially collect on its own.

In addition to the components discussed above, the training device 10 may further include various other components. For example, the training device 10 may include a battery (e.g., a rechargeable Lithium battery), a battery charging system (e.g., wireless battery charger, wired battery charger), an accelerometer (e.g., three dimensional accelerometer), a gyroscope (e.g., a three dimensional gyroscope), a magnetometer (e.g., a three dimensional magnetometer) or other compass, a power regulator, a power supply and boost converter for the light source(s) 38, a user interface (e.g., on-off switch, volume control, reset button, display unit for displaying exercise results), a remote control or other controller for controlling one or more functions of the training device 10, any other component, or any combination of the preceding.

The training device 10 is a portable training device 10, in some examples. This may allow it to be moved and/or arranged in any manner. A user can pick up the training device 10 and bring it with them, wherever they go. The training device 10 may be positioned horizontal (i.e., upright) (as is seen in the FIG. 1A), or it may be positioned vertical (i.e., sideways). It may be attached to a wall (e.g., using magnets). It may be attached to a mounting pole or tripod, so as to keep it off the ground or floor. In some examples, the training device 10 may include a battery, thereby allowing it to be used without an electrical connection.

Modifications, additions, and/or substitutions may be made to the training device 10, the components of the training device 10, and/or the functions of the training device 10 without departing from the scope of the specification. For example, one or more of the functions of the processor(s) 62 may be performed by processors included on external devices (e.g., a Smartphone) in communication with the training device 10.

Figure 2:
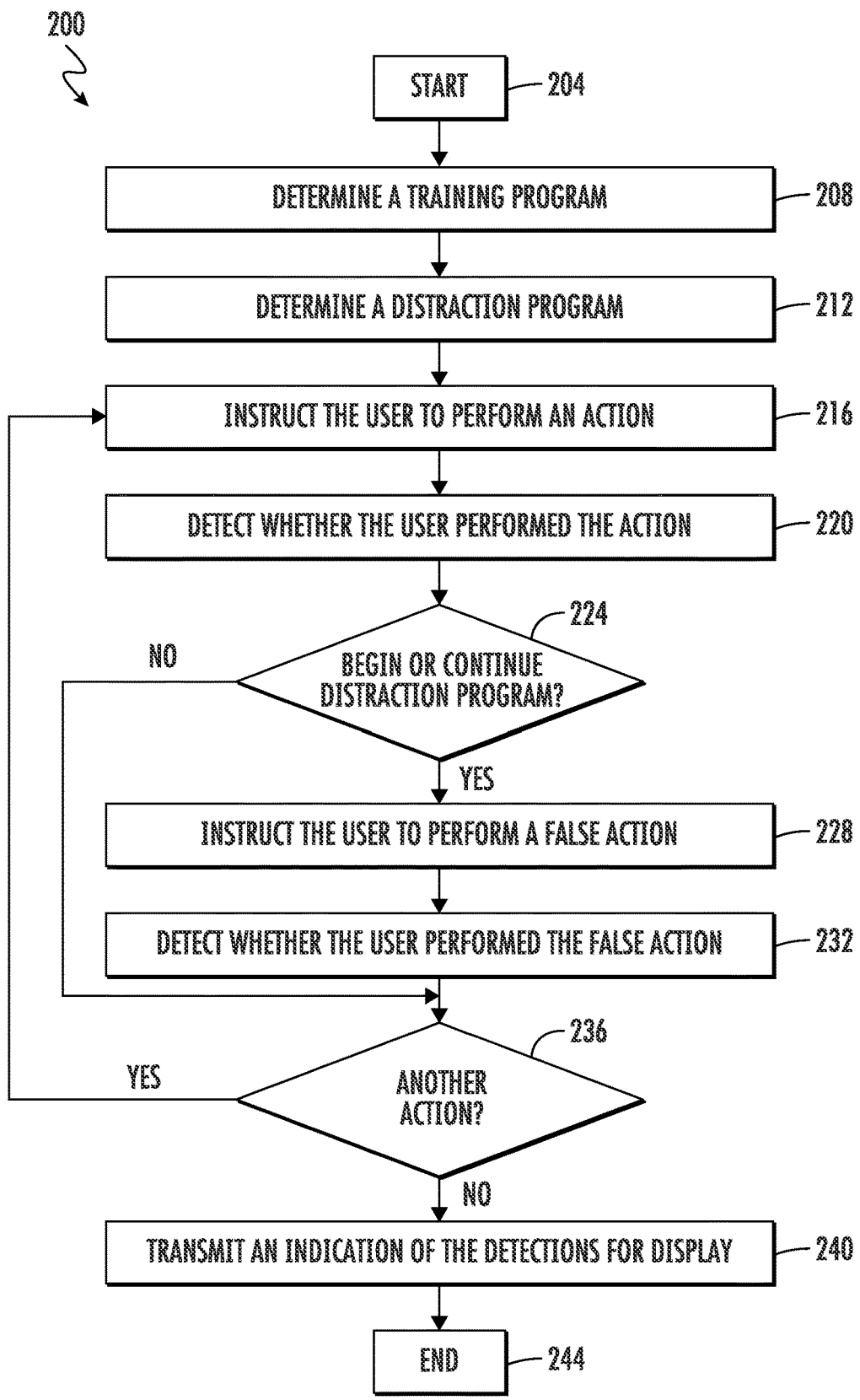
FIG. 2 is an example method of operation of the training device of FIG. 1A.

FIG. 2 illustrates one example of a method 200 of operation of the training device 10. The steps of method 200 are described below as being performed by the training device 10 (e.g., the processor(s) 62 of the training device 10). In other examples, one or more (e.g., all) of the steps of method 200 may be performed by other components or devices. For example, the training device 10 may not detect the actions/false actions. Instead, indications of the actions may be sent to an external device (e.g., a Smartphone), and the external device may detect the actions/false actions. As another example, a processor on an external device (e.g., a Smartphone) may control all or a portion of the training device 10, so as to instruct the training device 10 to perform one or more (e.g., all) of the steps of method 200.

In the illustrated example, a user (e.g., a person) utilizes the training device 10 to assist the user (or another person) in exercising and/or training (e.g., training for sports). To do so, the training device 10 may be set up and powered on. The training device 10 may be set up in any manner based on the type of exercise and training. For example, if the user is performing pushups, the training device 10 may be positioned on the floor in a horizontal position (as is seen in FIG. 1A) so that the user can perform pushups over or near the training device 10. As another example, if the user is running laps or routes, the training device 10 may be positioned on the floor in a horizontal position (as is seen in FIG. 1A), or the training device 10 may be attached to a structure (e.g., a training pole or tripod) in a horizontal position, so that the user can run by or around the training device 10. As a further example, if the user is performing a punch workout, the training device 10 may be attached to a wall or other structure in a vertical (i.e., sideways) position, so that the user can punch at the top surface of the lens cover 14. In the illustrated example, the user is utilizing only a single training device 10. However, the user may utilize any number of training device(s) 10 to exercise and/or train. For example, if the user is running laps, a training device 10 may be positioned on a track every 200 feet (for example), and the training device(s) 10 may communicate with each other to share external measurement information 84.

The method 200 starts at step 204. At step 208, the training device 10 determines a training program 74 for the user. The determined training program 74 may include a list of one or more actions to be performed by the user (e.g., pushups, sit ups), an order of performance of the action(s), a time frame for each action (e.g., start time, end time, repetition number), performance baselines for each action (e.g., minimum amount of performed actions in a set time, minimum speed (or other measurement) of performance), a list of visual signals (e.g., green light) and/or audio signals (e.g., buzzing noise) that represent the action(s) and/or other information in the training program 74, any other information that may be used to assist the user in exercising and/or training, or any combination of the preceding. In one example, the determined training program 74 may indicate that the user is supposed to perform 20 pushups within a 1 minute time period, where each pushup is performed at a particular time (or a random time) within that time period.

The training program 74 may be determined in any manner. For example, the training program 74 may be determined as a result of the user (or the training device 10, itself) selecting one training program 74 from a set of training programs 74 stored in the memory units 66. In such an example, the user may select the training program 74 using a user interface for the training device 10 (e.g., a control panel on the training device 10, a remote control for the training device 10). As another example, the training program 74 may be determined as a result of the training program 74 being transmitted to the training device 10 from an external device. As one example of this, the training program 74 may be created on a computing device (e.g., a laptop, a Smartphone) by the user or a trainer of the user, and then the training program 74 may be transmitted to (or downloaded to) the training device 10 (e.g., via the communication network). As a further example, the training program 74 may be determined as a result of the training device 10 generating the training program 74. For example, the training device 10 may utilize historical training data and current statistical information for the user to generate the training program 74 (e.g., using other training programs 74).

At step 212, the training device 10 determines a distraction program 78 for the user. The determined distraction program 78 may include a list of one or more false actions to be performed by the user (e.g., pushups, sit ups, math problems), a list of visual signals (e.g., green light) and/or audio signals (e.g., buzzing noise) that represent the false action(s), or any combination the preceding. As one example of this, the user may be training by performing a pushup each time the training device 10 displays a green circle using light source(s) 38, and the distraction program 78 may cause the training device 10 to display a red circle using the light source(s) 38 in-between two successive green circles. In such an example, the display of the red circle is an instruction to the user to perform a false action (e.g., another pushup), and the user is supposed to ignore the instruction and not perform the action (e.g., another pushup).

The distraction program 78 may be determined in any manner. For example, the distraction program 78 may be determined as a result of the user (or the training device 10, itself) selecting one distraction program 78 from a set of distraction program 78 stored in the memory units 66. In such an example, the user may select the distraction program 78 using a user interface for the training device 10 (e.g., a control panel on the training device 10, a remote control for the training device 10). As another example, the distraction program 78 may be determined as a result of the distraction program 78 being transmitted to the training device 10 from an external device. As an example of this, the distraction program 78 may be created on a computing device (e.g., a laptop, a Smartphone) by the user or a trainer of the user, and then the distraction program 78 may be transmitted to (or downloaded to) the training device 10 (e.g., via the communication network). As a further example, the distraction program 78 may be determined as a result of the training device 10 generating the distraction program 78. For example, the training device 10 may utilize the determined training program 74 (determined above in step 208) to generate a distraction program 78 based on the training program 74. For example, if the training program 74 utilizes green circles to instruct the user to perform an action, the training device 10 may generate a distraction program 78 that inserts red circles (or other shapes or sounds) into the display sequence presented by the training device 10. In other examples, the distraction program 78 may be manually controlled by a second user (e.g., a trainer). This manual control may cause the training device 10 to present a shape or sound (e.g., a red circle) whenever the second user presses a button on a remote (or says a word into a microphone). In such an example, the training device 10 may determine the distraction program 78 based on manual input by the user.

At step 216, the training device 10 instructs the user to perform an action in accordance with the training program 74. The training device 10 may instruct the user to perform any type of action. For example, the training device 10 may instruct the user to perform a sit up, pushup, burpee, punch, kick, hand waive over the training device 10, foot waive over the training device 10, run, run a particular speed (e.g., fast, slow, maximum), run in a particular direction (e.g., run to right, run to left, run a circle around the training device 10, run to the left-most positioned training device 10), walk, any other action, or any combination of the preceding.

The training device 10 may instruct the user to perform an action in any manner. For example, based on the training program 74 (e.g., signals listed in the training program 74), the training device 10 may provide a visual and/or audio indication of the action to be performed by the user. As one example of this, the training device 10 may utilize the light source(s) 38 (such as one or more addressable RGB LEDs) to display a visual indication (e.g., a green circle, a blue pulsing light, a colored checkmark, a colored arrow) to indicate that the user is to perform a pushup. As another example of this, the training device 10 may utilize the speaker 42 to emit an audio indication (e.g., a buzzing noise, the word "pushup", the word "go") to indicate that the user is to perform a pushup. The training device 10 may utilize a visual and/or audio indication to tell the user when to perform the action (e.g., when the green circle is displayed), what action to perform (e.g., pushup when a green circle is displayed, sit up when a red arrow is displayed, burpee when a yellow half circle is displayed), any other information, or any combination of the preceding. In some examples, the training device 10 may not indicate what action to perform. In such examples, the user may already know that they are only performing pushups (e.g., their coach or trainer told them), and the training device 10 may only indicate when that action is to be performed (e.g., perform a pushup each time a green symbol is displayed).

At step 220, the training device 10 detects whether the user performed the action. The training device 10 may detect whether the user performed the action in any manner. For example, the time of flight sensor(s) 30 and/or time of flight sensor(s) 50 may sense an action performed by the user, and then the time of flight sensor(s) 30 and/or time of flight sensor(s) 50 may transmit an indication of that sensed action to the processor(s) 62. As an example of this, one or more of the time of flight sensors 30 may sense the user positioned above the time of flight sensors 30, and may further sense the user moving vertically downwards towards and then vertically away from the time of flight sensors 30 (consistent with a pushup). These time of flight sensors 30 may then may transmit an indication of that action (e.g., the pushup) to the processor(s) 62. The indication of the sensed action may be any information that allows the processor(s) 62 to identify the sensed action, so as to determine whether the user has performed the action. As an example, when the time of flight sensor 30 senses the user performing a pushup (discussed above), the time of flight sensor 30 may transmit data to the processor 62 that identifies the user's position (e.g., distance from the sensor 30) at a particular time throughout (or at different time segments) during the pushup. This data may allow the processor(s) 62 to detect that the user is performing a pushup. It may also allow the processor(s) 62 to determine any information regarding the pushup, such as time for each complete pushup, the speed of descent, the speed of ascent, distance at bottom of pushup, distance at top of pushup, number of pushups, any other information, or any combination of the preceding.

In some examples, this detection in step 220 may not include a determination regarding whether the proper action was performed. That is, the processor 62 may not determine the exact action performed by the user. Instead, the processor 62 may only detect that an action was performed (whether or not it was the correct action). The processor 62 may transmit an indication of this detection to another device (at step 240 below), and the other device may determine the type of action that was performed and may further determine any other information about the action.

At step 224, the training device 10 determines whether to instruct the user to perform false action(s) in accordance with the distraction program 78. The training device 10 may make the determination in any manner. For example, the training device 10 may make the determination based on the distraction program 78. As an example of this, the distraction program 78 may include instructions regarding when to start false actions (e.g., after 1 minute, after 10 actions in the training program 74, after 10 correctly detected actions in the training program). As another example, the training device 10 may make the determination based on the external measurement information 82. As an example of this, the training device 10 may determine to start false actions when a user's heart rate (e.g., received from a heart rate monitor worn by the user) reaches a predetermined heart rate. The predetermined heart rate may be any amount, such as a particular heat rate amount (e.g., 150 beats per minute, 160 beats per minute, a heart rate amount set by the user or a trainer) or a particular range of heart rates (e.g., a max heart rate for the user of 50% or greater (where max heart rate is 220 minus the user's age), a max heart rate for the user of 75% or greater, a max heart rate for the user of 90% or greater, a range of heart rate set by the user or a trainer). As another example, the training device 10 may make the determination based on an instruction received by the training device 10. As an example of this, the training device 10 may determine to start false actions when a user or a user's coach (or any other entity) instructs the training device 10 to start false actions (e.g., by pressing a button on a remote or other device, by giving a vocal command to the training device 10).

If the training device 10 makes a determination to not instruct the user to perform false action(s), the method moves to step 236. Alternatively, if the training device 10 makes a determination to instruct the user to perform false action(s), the method moves to step 228.

At step 228, the training device 10 instructs the user to perform a false action in accordance with the distraction program 78. The training device 10 may instruct the user to perform any type of false action. For example, the training device 10 may instruct the user to perform a sit up, pushup, burpee, punch, kick, hand waive over the training device 10, foot waive over the training device 10, run, run a particular speed (e.g., fast, slow, maximum), run in a particular direction (e.g., run to right, run to left, run a circle around the training device 10, run to the left-most positioned training device 10), walk, any other physical action, solve a math problem, count to a particular number, any other mental action, or any combination of the preceding.

The training device 10 may instruct the user to perform a false action in any manner. For example, based on the distraction program 78 (e.g., signals listed in the distraction program 78), the training device 10 may provide a visual and/or audio indication of the false action to be performed by the user. As one example of this, the training device 10 may utilize the light source(s) 38 (such as one or more addressable RGB LEDs) to display a visual indication (e.g., a red circle, a red pulsing light, a colored "X", a colored arrow) to indicate that the user is to perform a pushup. As another example of this, the training device 10 may utilize the speaker 42 to emit an audio indication (e.g., a buzzing noise, the word "pushup", the word "go") to indicate that the user is to perform a pushup. The training device 10 may utilize a visual and/or audio indication to tell the user when to perform the false action (e.g., when the red circle is displayed), what action to perform (e.g., pushup when a red circle is displayed, sit up when a red arrow is display, burpee when a red half circle is displayed, count the number of yellow flashing lights, answer the question "what rhymes with dog" emitted from the speaker 42), any other information, or any combination of the preceding. In some examples, the training device 10 may not indicate what false action to perform. In such examples, the user may already know that they are only performing pushups (e.g., their coach or trainer told them), and the training device 10 may only indicate when that false action is to be performed (e.g., perform a pushup each time a red symbol is displayed).

At step 232, the training device 10 detects whether the user performed the false action. The training device 10 may detect whether the user performed the false action in any manner. For example, one or more of the time of flight sensors 30 and/or time of flight sensors 50 may sense an action performed by the user, and then these time of flight sensors 30 and/or time of flight sensors 50 may transmit an indication of that sensed action to the processor(s) 62. As an example of this, one or more of the time of flight sensors 30 may sense the user positioned above the time of flight sensors 30, and may further sense the user moving vertically downwards towards and then vertically away from the time of flight sensors 30 (consistent with a pushup). These time of flight sensors 30 may then may transmit an indication of that action (e.g., the pushup) to the processor 62. The indication of the sensed action may be any information that allows the processor 62 to identify the sensed action, so as to determine whether the user has performed the false action. As an example, when the time of flight sensor(s) 30 senses the user performing a pushup (discussed above), the time of flight sensor(s) 30 may transmit data to the processor(s) 62 that identifies the user's position (e.g., distance from the sensor 30) at a particular time throughout (or at different time segments) during the pushup. This data may allow the processor(s) 62 to detect that the user is performing a pushup. It may also allow the processor(s) 62 to determine any information regarding the pushup, such as time for each complete pushup, the speed of descent, the speed of ascent, distance at bottom of pushup, distance at top of pushup, number of pushups, any other information, or any combination of the preceding.

In some examples, this detection in step 232 may not include a determination regarding whether the proper false action was performed. That is, the processor 62 may not determine the exact false action performed by the user. Instead, the processor 62 may only detect that an action was performed (whether or not it was the correct action). The processor 62 may transmit an indication of this detection to another device (at step 240 below), and the other device may determine the type of action that was performed and may further determine any other information about the action.

At step 236, the training device 10 determines whether to instruct the user to perform another action in accordance with the training program 74. If the training device 10 makes a determination to not instruct the user to perform another action, the method moves to step 240. Alternatively, if the training device 10 makes a determination to instruct the user to perform another action, the method back to step 216, where the training device 10 instructs the user to perform an action in accordance with the training program 74. Then steps 216-236 are repeated. Steps 216-236 may be repeated any number of times. For example, steps 216-236 may be repeated until the training program 74 is complete, until the user or trainer shuts down the training program 74 (e.g., by pressing a button on a remote or other device), until the external measurement information 84 shuts down the training program 74 (e.g., a user's heart rate exceeds a particular amount, such as 100% of the user's maximum heart rate), until a predetermined time has elapsed (e.g., a predetermined training period of 5 minutes, 10 minutes, 30 minutes, or any other amount of time), until the training program 74 is shut down or paused for any other reason, or any combination of the preceding. The method then moves to step 240.

At step 240, the training device 10 transmits indication(s) of one or more of the detections for display. The indication of one or more of the detections may be any type of indication associated with a detected action. As one example of the indication, the indication may be data retrieved from the time of flight sensor(s) 30 and/or time of flight sensor(s) 50 regarding a detected action. As an example of this, if the user performed a pushup, the indication may be any data that allows a processor (e.g., a processor on a device external to the training device 10) to determine that the user performed a pushup and/or any information regarding the pushup, such as time for each complete pushup, the speed of descent, the speed of ascent, distance at bottom of pushup, distance at top of pushup, number of pushups, any other information, or any combination of the preceding. This indication may be transmitted to a device external to the training device 10 (e.g., a Smartphone, a laptop, a database) or to a display included on the training device 10, where all or a portion of the information can be displayed to a user. Prior to display (or prior to transmission), the information in the indication may be combined into a displayable format (e.g., a spreadsheet, graph) that allows a user to more easily understand the information.

As another example of the indication, the indication may be a signal that causes the training device 10 to provide a visual and/or audio indication of the detected action. As an example of this, if user was instructed to perform a pushup, and the user did perform the pushup, the training device 10 may utilize the light source(s) 38 (such as one or more addressable RGB LEDs) to display a visual indication to indicate that the user successfully performed a pushup. The indication may be different from that used to instruct the user to perform the action (or false action). For example, if the training device 10 displayed a green circle to instruct the user to perform the pushup, the training device 10 may display a blue circle to indicate that the pushup was performed. As another example, if the training device 10 displayed a green circle to instruct the user to perform the pushup, that green circle may continue to be displayed until the user performs the pushup, and then the training device 10 may display nothing (until the next instruction). That is, performance of the action makes the green circle go away. As another example, if the training device 10 displayed a blue circle to instruct the user to perform a false action (e.g., another pushup), the training device 10 may display a red "X" to indicate that the user performed the false action when they should not have.

The training device 10 may transmit any number of indications, and each indication may be for any number of detections. For example, the training device 10 may transmit an indication for each detection. As another example, the training device 10 may transmit one indication that includes all of the detections within a particular time period. As one example of this, if the training program 74 is ten minutes long, the training device 10 may transmit a single indication that includes all of the detections that occurred during the ten minute period. Such an indication may be transmitted to a processor on a device external to the training device 10 (e.g., the user's Smartphone), and the processor may display the transmitted information (e.g., it may provide a report that summarizes the workout).

The training device 10 may transmit an indication at any time. For example, the training device 10 may transmit an indication following each detection. In such an example, step 240 may be performed following or concurrent with step 220 (where the training device 10 detects whether the user performed the action) and/or step 232 (where the training device 10 detects whether the user performed the false action). In some examples, this may allow the training device 10 to provide a visual and/or audio indication of the detected action (e.g., performance of the instructed action makes the training device 10 stop displaying a green circle). As another example, the training device 10 may transmit an indication following more than one detection, such as following a particular time period (e.g., transmit an indication after the 10 minute training program 74 is finished), following a particular amount of detected actions (e.g., transmit an indication after the 10 actions have been detected), any other time, or any combination of the preceding.

The method 200 then moves to step 244, where the method 200 ends.

Modifications, additions, or omissions may be made to the method 200 without departing from the scope of the disclosure. For example, one or more steps of the method 200 may be performed in a different order, or may be performed simultaneously. In other examples, one or more steps of the method 200 may be omitted. For example, in some examples, the method 200 may not include a distraction program 78 or steps 224-232 associated with the distraction program 78.

The training device 10 may be used for various skill testing/training. For example, a user may be signaled to perform some action in response to lights and/or sounds produced by the training device 10. The lights may be created by light sources 38 included on the training device 10, and the lights may form numbers, shapes, lighted regions, colors, flashing patterns, etc. The sounds may be audio instructions, start/stop buzzer, etc. The training device 10 may operate with preprogramed training programs 74, user configured programs, and downloadable supplemental programs. One example of the training program(s) 74 instructs a user to pass a ball when the training device 10 displays a red light, and to also ignore other light configurations or sounds from a speaker. The training device 10 may include sensors 30, 50 to measure reaction time, accuracy, completion, or perform various time gate operations.

The training device 10 may be positioned on a stand or adhered to a wall (e.g., using a magnet). Users may touch or wave a hand over the training device 10 in response to instructions, and time of flight sensors 30, 50 may detect the user. For time gate use, the user may be instructed to run a particular route around the training device 10 (or in-between multiple training devices 10), and the training device(s) 10 may detect (and record) the response/speed time. This response/speed time (or other metric) can be output to the user (e.g., via a graphical display or report on the user's Smartphone or computer)

By interfacing with the training device 10, user(s) can set off multiple triggers via interaction with time of flight sensors 30, 50 in the training device 10. These triggers can start/stop timing, initiate counting up or down, or cause different light patterns or colors to appear, which can signal or instruct users to perform further tasks. Triggers can be set off in combinations by interacting with different combinations of time of flight sensors 30, 50. The time of flight sensors 30, 50 may be configured to trigger on (or otherwise sense) a user (or objects) that is within a predetermined distance (proximity) and/or that is moving at a predetermined rate of speed or change of speed. An accelerometer may be used to initiate a trigger when the training device 10 is shook. Sounds may be setup to be played by the training device 10 when triggered.

The training device 10 may assist a user in training to perform under physical (not mental) fatigue, in some examples. As an example of this, the training device 10 may utilize a distraction program 78 to try and distract the user. This distraction may help the user learn to ignore their own brain commends to stop or slow down, which can further assist in training and sports. The capacity to sustain high-intensity aerobic exercise is essential for endurance performance. Therefore, it is important to understand what the factor is that is limiting time to exhaustion ("TTE") in healthy and fit adults. Perception of effort (rather than severe locomotor muscle fatigue or intolerably unpleasant muscle pain) is the cardinal exercise stopper during high-intensity aerobic exercise, in some examples. The brain regulates the ability to run fast by unconsciously slowing you down (e.g., by reducing the efficiency and abilities of physiological systems before you need to). Fatigue is "illusionary" or an "emotion" and therefore can be worked through or ignored. In sports, stopping an action due to tiredness or the perception of fatigue can make the difference in winning or losing (e.g., by not making the extra goal or point by making an extra run).

In some examples, the training device 10 may assist a user to train to ignoring this perception of fatigue. As one example of this, the training device 10 may utilize a training program 74 to get the user's heart rate to a predetermined rate (e.g., max heart rate, 90% of max heart rate, at least 75% of max heart rate). While the heart rate is at the predetermined rate, the training device 10 may continue the training program 74 (using time of flight sensors 30, 50), and may further trigger one or more action(s) or exercise that selectively activate different parts of the brain. For example, the training device 10 may emit lights and sounds that instruct the user to perform one or more false physical actions (e.g., sit up, pushup). As another example, the training device 10 may instruct the user to perform other false actions, such as to perform math problems, perform logic problems, and/or listen to instructions, all while keeping heart intensity at the predetermined rate. By focusing on avoiding the false physical action (or by focusing on the math problems, logic problems, and/or instructions) the user may begin to ignore signals coming from their brain governor (so as to keep exercising at a high intensity for a desired amount of time). The goal, in some examples, is to be able to ignore the brain commands to stop or slow down due to psychological or physical tiredness by learning to focus on a different goal or task (e.g., like making the extra run to score a goal).

The training device 10 may be used to improve reaction time, peripheral vision, decision making, and/or cognitive ability under stress or fatigue for athletes. Fatigue based training (e.g., training at or near max heart rate) is the underlying mechanism that is used to speed up the learning process in such a way as to accelerate moving the above athletic traits/skills from the conscious to subconscious, in some examples. In some examples, the training device 10 may improve one or more of the following: reaction, hand eye coordination, foot eye coordination, motor skills, ocular motor skills, critical thinking, peripheral vision, cognitive learning, mental conditioning, physical fitness, pacing, physical speed, acceleration, agility, ball control, range of passing, shooting, analytical aptitude, scenario evaluation, decision making under stress, multitasking of skills, awareness, depth perception, adaptation to change, focus to attention of detail, visual memory, neurostimulation, cognitive flexibility, thinking under pressure, performing under fatigue, performing under fatigue with attack, performing under metal fatigue, reaction time, and/or concentric overload training or performance. In some examples, the training device 10 may be used to: improve cognitive processing, provide realistic close-range training, provide immediate visual response, measure reaction time, train central focal peripheral awareness, provide shoot do not shoot training, improve speed/agility/accuracy, improve decision making under stress, provide force on target training, provide engaged focus training with real time measurements, provide dynamic movement of the shooter, provide traditional timing for strength and conditioning training, improve surround awareness, improve predictable actions, improve opponent anticipation, improve movement foresight, improve alertness under fatigue, improve burst of energy under fatigue, improve moving action to the sub conscious for automatic performance, improve multi-tasking, provide slow twitch versus fast twitch distribution training, improve reserve energy phenomenon, and/or help brain generate more myelin.

FIG. 3 illustrates one example of a training system 300 that utilizes one or more training devices 10. The components of the training system 300 may operate together to assist a user in exercising and/or training (e.g., training for sports).

In the illustrated example, the training system 300 includes one or more training devices 10. The training system 300 may include any number of training devices 10, and the training devices 10 may be arranged in any manner for assisting a user in exercise or training (e.g., training for sports). As one example of the arrangement, the training devices 10 may be arranged in a straight row over a 40 yard distance, with each positioned at a 10 yard interval. In such an example, the training devices 10 may be positioned on the ground, positioned on a tripod mount in a horizontal (i.e., upright) position, positioned on a tripod mount in a vertical (i.e., sideways) position, or positioned in any other manner. The training devices 10 may be used as timing gates that detect a single runner performing a 40 yard dash, or detect two runners performing a 40 yard dash (where each runner is on an opposite side of the row of training devices 10). By detecting the user, the training devices 10 may detect information regarding a user's speed over the distance, time to complete each 10 yard section (or the entire 40 yard route), acceleration, deacceleration, any other information about the run, or any combination of the preceding. This information may be transmitted for display to the user (e.g., in the form of a graph), so as to assist in the training.

As another example of the arrangement, only a single training device 10 may be used, and it may be arranged in the middle of a circular running route. In such an example, the training device 10 may be positioned on the ground, positioned on a tripod mount in a horizontal (i.e., upright) position, positioned on a tripod mount in a vertical (i.e., sideways) position, or positioned in any other manner. The training device 10 may detect a single runner performing a full 360 degree turn (or circle) around the training device 10. By detecting the user, the training device 10 may detect information regarding a user's turn speed over the entire 360 degree circle (at 90 degree intervals), time to complete each 90 degree section (or the entire 360 degree circle), acceleration, deacceleration, any other information about the run, or any combination of the preceding. This information may be transmitted for display to the user (e.g., in the form of a graph), so as to assist in the training.

As another example of the arrangement, three training devices 10 may be arranged in a straight row over a 10 yard distance, so as to create a 5 by 10 by 5 shuttle run route. In such an example, the training devices 10 may be positioned on the ground, positioned on a tripod mount in a horizontal (i.e., upright) position, positioned on a tripod mount in a vertical (i.e., sideways) position, or positioned in any other manner. The training devices 10 may be used as timing gates that detect a single user performing a 5 by 10 by 5 shuttle run route. By detecting the user, the training devices 10 may detect information regarding a user's speed to run 5 yards to the left (or right), a user's speed to run 10 yards to the right (or left), time to complete each shuttle run, acceleration, deacceleration, any other information about the run, or any combination of the preceding. This information may be transmitted for display to the user (e.g., in the form of a graph), so as to assist in the training.

As another example of the arrangement, 20 training devices 10 may be arranged in a 5 by 4 grid on the floor, so as to create a reaction floor. The training devices 10 may detect a user waiving their foot over a training device 10 (as it displays light and/or generates sound). By detecting the user, the training devices 10 may detect information regarding a user's reaction speed (after a training device 10 displays light or generates sound), number of training devices 10 correctly waived at, any other information about the session, or any combination of the preceding. This information may be transmitted for display to the user (e.g., in the form of a graph), so as to assist in the training.

As another example of the arrangement, 20 training devices 10 may be arranged in a 5 by 4 grid on the wall (or other vertical structure), so as to create a reaction wall. The training devices 10 may detect a user waiving their hand over a training device 10 (as it displays light and/or generates sound). By detecting the user, the training devices 10 may detect information regarding a user's reaction speed (after a training device 10 displays light or generates sound), number of training devices 10 correctly waived at, any other information about the session, or any combination of the preceding. This information may be transmitted for display to the user (e.g., in the form of a graph), so as to assist in the training.

In the illustrated example, the training system 300 further includes one or more networks 314. A network 314 may be an example of the communication network discussed above. The network 314 represents any suitable network operable to facilitate communication between the components of the training system 300. The network 314 may include any interconnecting system capable of transmitting audio, video, signals, data, messages, or any combination of the preceding. The network 314 may include all or a portion of a public switched telephone network (PSTN), a public or private data network, a LAN, a MAN, a WAN, a WPAN, a local, regional, or global communication or computer network, such as the Internet, a wireline or wireless network, an enterprise intranet, or any other suitable communication link, including combinations thereof, operable to facilitate communication between the components. In some example, the communication network may include a WPAN (which may include, for example, BLUETOOTH, BLUETOOTH low power, BLUETOOTH 5, ANT+, ZIGBEE (IEEE 802.15.4), other IEEE 802.15 protocols, IEEE 802.11 A, B or G without limitation, and Wi-Fi (IEEE 802.11)), a cellular communication network, an infrared communication network, any other wireless network operable to facilitate communication between the components, or any combination of the preceding. The training system 300 may include any number of networks 314. Furthermore, components of the training system 300 may use different networks 314 to communicate.

In the illustrated example, the training system 300 further includes one or more network hubs 318. A network hub 318 may be any networking device which is used to connect multiple devices in a network, such as a network 314. As one example, the network hub 318 may be an E-1 central controller, such as an EPIC Wi-Fi interface. The network hub 318 may provide a link between the components of the training system 300 over the network(s) 314, thereby acting as an intermediary between the components. The network hub 318 may send out signals to multiple components of the training system 300 and communicate with them via 2-way communication. As an example, the network hub 318 may communicate with the user device 334 (and a program or application executed on the user device 334) via BLUETOOTH, and the network hub 318 may communicate with the training device(s) 10, user measurement devices 322, external training units 326, and/or database units 330 via radio frequencies (RF). In other examples, the network hub 318 may utilize WI-FI, nonlinear Fourier transform (NFT), any other communication protocol, or any combination of the preceding. The components of the training system 300 can be addressed on different frequencies, or messages can be addressed to particular components. In additional examples, the components of the training system 300 may utilize a mesh network (e.g., hub and spoke, or any other mesh architecture), where the components communicate with each other in order to reach all components. In some examples, the functions of the network hub 318 may be provided by one or more of the other components of the training system 300. For example, the functions of the network hub 318 may be provided by the training device 10 or the user device 334.

In the illustrated example, the training system 300 further includes one or more user measurement devices 322. A user measurement device 322 is any device that can sense, detect, measure, determine, and/or monitor a status of a user. For example, a user measurement device 322 may be a heart rate monitor that measures the heart rate of a user, and transmits that measurement to one or more components of the training system 300. As another example, a user measurement device 322 may be a temperature monitor that measures the temperature of a user, and transmits that measurement to one or more components of the training system 300. As a further example, a user measurement device 322 may be a global positioning system (GPS) device that determines the current global position of a user, and transmits that position to one or more components of the training system 300. As a further example, a user measurement device 322 may be a step device (e.g., FITBIT, IPHONE) that determines the number of steps or exercise time of a user, and transmits that information to one or more components of the training system 300. The information sensed, detected, measured, determined, and/or monitored by a user measurement device 322 may be utilized by the components of the training system 300 to assist the user in training. For example, the user's heart rate (measured by a heart rate monitor) may be sent to a training device 10 (or to any other component), and utilized to determine whether to begin a distraction program 78. As another example, the user's heart rate (measured by a heart rate monitor) may be sent to a database unit 330 (or to any other component), and utilized to create one or more training reports about the user.

In the illustrated example, the training system 300 further includes one or more external training units 326. An external training unit 326 is any training device or structure (other than a training device 10). For example, a training unit 326 may be a ball launcher that can launch a ball to be caught by a user, Alinea race lanes, a time clock that can keep track of the time that the user is exercising, an edge training pole, a reaction wall or floor, a race sensor (e.g., race finish line sensor), an external counter (e.g., a counter for counting shots through a hoop), any other training device or structure, or any combination of the preceding. Information from the external training unit 326 may be utilized by the components of the training system 300 to assist the user in training. For example, the information about a ball that was launched by a ball launcher (e.g., speed, height, distance, etc.) may be sent to a database unit 330 (or to any other component), and utilized to create one or more training reports about the user.

In the illustrated example, the training system 300 further includes one or more database units 330. A database unit 330 represents any suitable components that receive information regarding a user, store the information in a database, and provide access to the information. A database unit 330 may include a network server, any suitable remote server, a mainframe, a host computer, a workstation, a web server, a personal computer, a laptop, a mobile telephone (such as a Smartphone), an electronic notebook, a personal digital assistant, a file server, any other suitable device for receiving information regarding a user, storing the information in a database, and providing access to the information, or any combination of the preceding. The database unit 330 may include (or have access to) one or more databases. A database refers to a collection of information that may be specially organized for search and retrieval by a database management system. The database may be stored as a set of files on, for example, magnetic disk or tape, optical disk, or some other secondary storage device. The information in these files may be broken down into records, each of which may consist of one or more fields. The database may be any type of database. For example, the database may be a relational database (e.g., Oracle database, MySQL, Microsoft SQL Server, PostgreSQL, DB2, etc.), or a non-relational database/NoSQL database (e.g., Redis, Amazon DynamoDB, etc.). Furthermore, the database may be a distributed database.

As is discussed above, the database unit 330 may receive information regarding a user, store the information in a database, and provide access to the information. The information received by the database unit 330 may be any of the information gathered, sensed, detected, measured, determined, and/or monitored by any of the other components of the training system 10, such as the training device(s) 10, user measurement devices 322, and external training units 326. As such, the information may be any information about the user, and the user's workout(s) or training session(s).

The information received by the database unit 330 may be cleaned, organized, and may undergo analytical analysis to prepare one or more training reports. The training report may be a universal evaluation metric including standardized categories of skills and abilities that may be used by athletes, coaches, and athletic departments/recruiting to compare athletes or gauge athletic development both physically and mentally. These training reports (and/or the original information) may be used for research and development, and may be shared with outside users (e.g., through a subscription service) that may use the data or analytics for their own purposes, such as medical/scientific research, developmental/training/wellness analysis, sports/recruiting, marketing/demographics, or other purposes. For example, a sports recruiter may search the database(s) in the database units(s) 330 to identify a particular type of athlete having particular speed, agility, and reaction time (possibly under particular levels of stress). For privacy purposes, the athlete may need to approve the distribution of the data. In some examples, identifying information may be cleaned from the data and/or training reports. The database unit(s) 330 may allow for the creation of a community of users that input their data (e.g., athletes), and a community of users that take out the data (e.g., coaches, recruiters, researchers, trainers). The training report (and/or the original information) may identify the devices from which information was received, so as to compensate for different levels of accuracy. For example, a user's heart rate may be identified as having been collected by a GARMIN watch or a SAMSUNG chest worn heart rate monitor.

In the illustrated example, the training system 300 further includes one or more user devices 334. The user device 334 is any device that receives data, stores data, and/or transmits data. For example, the user device 334 may be (or may include) a personal computer, a laptop, a mobile telephone (such as a Smartphone), an electronic notebook, a personal digital assistant, a host computer, a workstation, a web server, a network server, any suitable remote server, a mainframe, a file server, any other computing or processing device, any other device for receiving data, storing data, and/or transmitting data, or any combination of the preceding. In the illustrated example, the user device 334 include one or more processors that execute a program or software application ("app") associated with the training system 300. When executing this program or app, the user device 334 may allow the user to communicate with and/or control one or more components of the training system 300. For example, the user device 334 (e.g., via the app) may allow a user to create, modify, and/or select a training program 74 or a distraction program 78 for use in the training device(s) 10, and this training program 74 or distraction program 78 may be transmitted to the training device(s) 10 for execution. This may allow users (such as coaches) to design particular training programs 74 through the app for their athletes or to select available training programs 74. Such training programs 74 may provide a training aspect to improve performance or they may be a testing or evaluation program to test or evaluate skills, concentration, cognitive ability, speed, agility, or reaction time under fatigue. As a further example, the user device 334 (e.g., via the app) may allow a user to control the training device(s) 10 in any other manner, or control any of the other components of the training system 300. As an example of this, the user device 334 may allow the user to manually trigger a distraction program 78, may allow a user to set a predetermined heart rate (or change a pre-set heart rate), may allow a user to enter information about the user (e.g., age, max heart rate), or may allow a user to cancel the training program 74/distraction program 78 early (or to extend the program). As another example, the user device 334 (e.g., via the app) may display results received from the training device(s) 10 of the training (e.g., indications of the detection), and/or may display training reports retrieved from the database unit 334.

In an example of operation, the user may set up one or more of the training device(s) 10, user measurement devices 322, external training units 326, and/or the network hub 318. As an example of this, the user may arrange the training device(s) 10 to be in a straight row over a 40 yard distance, with each positioned at a 10 yard interval, and the user may further put on a heart rate monitor (i.e., a user measurement device 322). The user may further utilize the user device 334 to create, modify, and/or select a training program 74 and a distraction program 78. The training program 74 may include multiple runs of the 40 yard dash next to the training device(s) 10. The distraction program 78 may include various false runs through the 40 yard dash, when the user's heart rate exceeds 70% of the maximum heart rate. This training program 74 and distraction program 78 (or the selection of each) may be transmitted to one (or all) of the training device(s) 10 (through the network(s) 314 and network hub(s) 318).

The user may then begin exercising in accordance with the training program 74. For example, the user may being running past the training devices 10 each time a training device 10 flashes a green circle, and may stop running as soon as a training device 10 flashes a red "X". This may create a start and stop training program, that may be repeated over and over. While training, the time of flight sensors 30, 50 may sense the running actions and stopping actions performed by the user. As an example of this, the time of flight sensors 30, 50 may sense when the user passes a training device 10 (e.g., acting as a time gate), the speed at which the user is moving, or any other information about the run and/or stop, and the training device(s) 10 may detect the actions performed by the user. The training device(s) 10 may communicate with each other (via the a network 314) so as to keep in sync, and/or to share collected date (e.g., sensed and/or detected actions).

While the user is exercising, the user's heart rate is collected by the user measurement device 322, and is transmitted to one or more of the training device(s) 10. When the user's heart rate exceeds 70% of the max heart rate, the training device(s) 10 may being executing the distraction program 78. This distraction program 78 may cause the training device(s) 10 to begin flashing blue circles and/or orange "X"s. This may force the user to further concentrate, so as to ignore the false actions (i.e., the blue circles, orange "X"s) of the distraction program 78, while continuing to perform the actions (e.g., the green circles, red "X"s) of the training program 74. The time of flight sensors 30, 50 may continue to sense the running actions and stopping actions performed by the user, thereby allowing the actions and false actions to be detected.

During or after the user's exercise, the training device(s) 10 transmit indications of the detections for display. As one example of this, the indications of the detections may be transmitted to the user device 334 after the user has completed exercising. As a result of this transmission, information about the user's exercise may be displayed to the user, allowing the user to review how they performed. The information may be displayed in any organizational structure. For example, it may be displayed in a graph or chart (e.g., a graph showing user speed over time, or over distance), as standalone data (e.g., a list of each detected action, at each time of detection), any other organizational structure, or any combination of the preceding. The information displayed may be organized (and/or summarized) by the training device(s) 10, or by the user device 334 (e.g., the app executed by the user device 334).

The user device 334 may further display information received from other components of the training system 300. For example, the user device 334 may display a summary of (or all of the data points for) the user's heart rate during the exercise (received from a heart rate monitor), a summary of (or all of the data points for) any information detected by additional components (e.g., any external training units 326 being used in the training session), or any combination of the preceding.

In some examples, the indications of the detections (or any other information gathered during the exercise) may be transmitted to the database unit 330. This may allow the database unit 330 to store the information about a user's exercise in one or more databases. It may also allow the database unit 330 to create training reports regarding the user. These training reports may then be distributed to athletes, coaches, athletic departments/recruiting, or any other person or entity, to compare athletes or gauge athletic development both physically and mentally.

Modifications, additions, and/or substitutions may be made to the training system 300, the components of the training system 300, and/or the functions of the training system 300 without departing from the scope of the specification.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed steps, components, elements, features, aspects, characteristics, limitations, and the like, of the various non-limiting and non-exhaustive examples described in this specification.

What is claimed is:

1. A portable training device, comprising:
    a first substrate having:
        a first set of one or more time of flight (ToF) sensors positioned on the first substrate to face in a vertical direction, wherein the first set of one or more ToF sensors comprises at least three ToF sensors;
        a plurality of addressable red, green, blue light emitting diodes (RGB LEDs) positioned on the first substrate to face in the vertical direction;

a second substrate positioned underneath the first substrate, the second substrate having:
one or more processors positioned on the second substrate; and
a second set of one or more ToF sensors positioned on a periphery of the second substrate to face in a horizontal direction that is perpendicular to the vertical direction, wherein the second set of one or more ToF sensors comprises at least four ToF sensors;
a base positioned underneath the second substrate; and
a lens cover coupled to the base, and positioned over the first substrate and the second substrate;
wherein the one or more processors are configured to:
determine a training program for a user that includes visual signals that represent a plurality of actions for performance by the user;
determine a distraction program for the user that includes visual signals that represent a plurality of false actions for performance by the user;
for each of the plurality of actions:
cause a first set of the plurality of addressable RGB LEDs to provide a visual indication of the corresponding action for performance by the user; and
following the visual indication of the corresponding action for performance by the user, utilize a first set of one or more indications received from the first set of one or more ToF sensors and/or the second set of one or more ToF sensors to detect whether the user performed the corresponding action;
determine whether a heart rate of the user has reached a predetermined rate of at least 75% of the max heart rate for the user; and
following a determination that the heart rate of the user has reached the predetermined rate of at least 75% of the max heart rate for the user, for each of the plurality of false actions:
following the visual indication corresponding to one of the actions of the plurality of actions, cause a second set of the plurality of addressable RGB LEDs to provide a visual indication of the corresponding false action for performance by the user;
following the visual indication of the corresponding false action for performance by the user, utilize a second set of one or more indications received from the first set of one or more ToF sensors and/or the second set of one or more ToF sensors to detect whether the user performed the corresponding false action; and
transmit an indication of one or more of the detections for display.

2. The portable training device of claim 1, wherein the first set of one or more ToF sensors comprises three ToF sensors positioned in a row.

3. The portable training device of claim 1, wherein the second set of one or more ToF sensors comprises four ToF sensors that are each positioned approximately 90 degrees from another of the four ToF sensors along the periphery of the second substrate.

4. A portable training device, comprising:
one or more substrates having:
a first set of one or more time of flight sensors (ToF) positioned to face in a first direction;
a plurality of addressable red, green, blue light emitting diodes (RGB LEDs) positioned to face in the first direction; and
a second set of one or more ToF sensors positioned to face in a second direction that is perpendicular to the first direction;
a base; and
a lens cover coupled to the base, and positioned over the one or more substrates;
wherein the portable training device includes and/or is in communication with one or more processors that are configured to:
determine a training program for a user that includes visual signals that represent a plurality of actions for performance by the user;
for each of the plurality of actions:
cause a first set of the plurality of addressable RGB LEDs to provide a visual indication of the corresponding action for performance by the user; and
following the visual indication of the corresponding action for performance by the user, utilize a first set of one or more indications received from the first set of one or more ToF sensors and/or the second set of one or more ToF sensors to detect whether the user performed the corresponding action; and
transmit an indication of one or more of the detections for display.

5. The portable training device of claim 4, wherein the first set of one or more ToF sensors comprises at least two ToF sensors, and the second set of one or more ToF sensors comprises at least three ToF sensors.

6. The portable training device of claim 4, wherein the plurality of RGB LEDs comprises at least 30 RGB LEDs.

7. The portable training device of claim 4, wherein the plurality of RGB LEDs comprises at least 37 RGB LEDs.

8. The portable training device of claim 4, wherein:
the one or more substrates comprises a first substrate and a second substrate;
the first set of one or more ToF sensors and the plurality of RGB LEDs are positioned on the first substrate; and
the second set of one or more ToF sensors are positioned on a periphery of the second substrate.

9. The portable training device of claim 4, wherein:
the one or more substrates further include one or more speakers;
the training program further includes audio signals that represent the plurality of actions for performance by the user; and
the one or more processors are further configured to:
for each of the plurality of actions:
cause the one or more speakers to provide an audio indication of the corresponding action for performance by the user; and
following the video indication and the audio indication of the corresponding action for performance by the user, utilize the first set of one or more indications received from the first set of one or more ToF sensors and/or the second set of one or more ToF sensors to detect whether the user performed the corresponding action.

10. The portable training device of claim 4, wherein:
the one or more substrates further include one or more speakers;
the training program further includes audio signals that represent a second plurality of actions for performance by the user; and the one or more processors are further configured to:
for each of the second plurality of actions:
cause the one or more speakers to provide an audio indication of the corresponding action for performance by the user; and
following the audio indication of the corresponding action for performance by the user, utilize a second set of one or more indications received from the first set of one or more ToF sensors and/or the second set of one or more ToF sensors to detect whether the user performed the corresponding action.

11. The portable training device of claim 4, wherein the one or more processors are further configured to:
determine a distraction program for the user that includes visual signals that represent a plurality of false actions for performance by the user;
for each of the plurality of false actions:
following the visual indication corresponding to one of the actions of the plurality of actions, cause a second set of the plurality of addressable RGB LEDs to provide a visual indication of the corresponding false action for performance by the user;
following the visual indication of the corresponding false action for performance by the user, utilize a second set of one or more indications received from the first set of one or more ToF sensors and/or the second set of one or more ToF sensors to detect whether the user performed the corresponding false action.

12. The portable training device of claim 4, wherein the one or more processors are further configured to:
determine a distraction program for the user that includes visual signals that represent a plurality of false actions for performance by the user;
determine whether a heart rate of the user has reached a predetermined rate; and
following a determination that the heart rate of the user has reached the predetermined rate, for each of the plurality of false actions:
following the visual indication corresponding to one of the actions of the plurality of actions, cause a second set of the plurality of addressable RGB LEDs to provide a visual indication of the corresponding false action for performance by the user; and
following the visual indication of the corresponding false action for performance by the user, utilize a second set of one or more indications received from the first set of one or more ToF sensors and/or the second set of one or more ToF sensors to detect whether the user performed the corresponding false action.

13. The portable training device of claim 12, wherein the predetermined rate is at least 75% of the max heart rate for the user.

14. A method, comprising:
determining, by one or more processors in a training system, a training program for a user that includes visual signals that represent a plurality of actions for performance by the user;
for each of the plurality of actions:
causing, by the one or more processors, a first set of a plurality of addressable red, green, blue light emitting diodes (RGB LEDs) included in a training device to provide a visual indication of the corresponding action for performance by the user;
following the visual indication of the corresponding action for performance by the user, utilizing, by the one or more processors, a first set of one or more indications received from a first set of one or more time of flight (ToF) sensors included in the training device and/or a second set of one or more ToF sensors included in the training device to detect whether the user performed the corresponding action;
determining, by the one or more processors, a distraction program for the user that includes visual signals that represent a plurality of false actions for performance by the user;
for each of the plurality of false actions:
following the visual indication corresponding to one of the actions of the plurality of actions, causing, by the one or more processors, a second set of the plurality of addressable RGB LEDs to provide a visual indication of the corresponding false action for performance by the user; and
following the visual indication of the corresponding false action for performance by the user, utilizing, by the one or more processors, a second set of one or more indications received from the first set of one or more ToF sensors and/or the second set of one or more ToF sensors to detect whether the user performed the corresponding false action; and
transmitting, by the one or more processors, an indication of one or more of the detections for display.

15. The method of claim 14, wherein the plurality of false actions for performance by the user comprise a plurality of physical actions for performance by the user.

16. The method of claim 14, wherein the plurality of false actions for performance by the user comprise a plurality of mental actions for performance by the user.

17. The method of claim 14, wherein:
the training program further includes audio signals that represent the plurality of actions for performance by the user; and
the method further comprises, for each of the plurality of actions:
causing, by the one or more processors, one or more speakers included in the training device to provide an audio indication of the corresponding action for performance by the user; and
following the video indication and the audio indication of the corresponding action for performance by the user, utilizing, by the one or more processors, the first set of one or more indications received from the first set of one or more ToF sensors and/or the second set of one or more ToF sensors to detect whether the user performed the corresponding action.

18. The method of claim 14, wherein:
the training program further includes audio signals that represent a second plurality of actions for performance by the user; and
the method further comprises, for each of the second plurality of actions:
causing, by the one or more processors, one or more speakers included in the training device to provide an audio indication of the corresponding action for performance by the user; and
following the audio indication of the corresponding action for performance by the user, utilizing, by the one or more processors, a second set of one or more indications received from the first set of one or more ToF sensors and/or the second set of one or more ToF sensors to detect whether the user performed the corresponding action.

* * * * *